United States Patent
Brown

[15] 3,640,326
[45] Feb. 8, 1972

[54] BOLT
[72] Inventor: Edward L. Brown, Middletown, Ohio
[73] Assignee: Armco Steel Corporation, Middletown, Ohio
[22] Filed: Oct. 17, 1969
[21] Appl. No.: 867,274

[52] U.S. Cl. ................................................151/37, 85/9
[51] Int. Cl. ..................................................F16b 39/282
[58] Field of Search ...........................151/35, 37, 41.5; 85/9

[56] References Cited

UNITED STATES PATENTS 3,512,446   5/1970   Sekhon..........................................85/9

FOREIGN PATENTS OR APPLICATIONS 146,234    4/1952   Australia ............................151/41.5
255,217    2/1963   Australia ..............................151/37
666,534    3/1965   Belgium.....................................85/9
533,732   12/1921   France....................................151/37
1,249,254 11/1960   France....................................151/37

Primary Examiner—Marion Parsons, Jr.
Attorney—Melville, Strasser, Foster & Hoffman

[57] ABSTRACT

A bolt, for use with curved pieces having aligned apertures, including ribs of trapezoidal cross section on the underside of the bolt head for engaging a portion of one of the apertures to prevent rotation of the bolt while tightening a nut thereon.

4 Claims, 5 Drawing Figures

PATENTED FEB 8 1972

3,640,326

INVENTOR/S

EDWARD L. BROWN

BY *Melville, Strasser, Foster and Hoffman*
ATTORNEYS

BOLT

BACKGROUND OF THE INVENTION

This invention relates to a bolt head design, and has great and particular utility in the joining of steel pieces having aligned apertures formed in mating, curved surfaces.

Locking bolts of various descriptions are of course very old in the art and well known. The so-called "carriage bolt" for example, is provided with a square shank portion immediately beneath the head, which square shank portion is driven into one of two pieces to be joined to prevent rotation of the bolt while the nut is tightened thereon.

Other locking bolt designs are shown in U.S. Pat. No. 1,857,388 in the name of Linderman et al., U.S. Pat. No. 2,562,032 in the name of Gutensohn, and U.S. Pat. No. 3,255,797 in the name of Attwood. All of these patents may be characterized as teaching a construction wherein a plurality of teeth are provided on the undersurface of the bolt head, which teeth, during the tightening operation engage the outer surface of one of the members being bolted together and prevent rotation of the bolt during tightening.

It will readily be observed that in each of these cases, the ribs or teeth on the underside of the bolt head are sharply pointed to facilitate the cutting or penetration of these teeth into the surface of one of the members being joined.

The structure of these references is indeed effective to prevent rotation of the bolt when tightening a nut thereon, when the bolt is used with a material into which the teeth or ribs can embed. When the material being bolted together is steel or the like, the problem is somewhat different. Although the bolt might be effective, with sharp, triangular teeth, the necessary degree of sharpness cannot be achieved in the conventional hot forging or cold heading operations.

SUMMARY OF THE INVENTION

This invention, in its broadest aspect, contemplates a bolt for fastening together curved steel elements having aligned apertures. The underside of the bolt head is provided with a plurality of radial ribs or teeth which are trapezoidal in cross section, and arranged to engage a portion of one of the apertures in such a manner as to prevent rotation of the bolt while tightening a nut thereon.

DESCRIPTION OF THE PREFERRED EMBODIMENT

As briefly indicated, the bolt of this invention is particularly adapted for joining steel pieces where the bolt holes are punched in a curved surface such as a corrugation. Corrugated steel sheets have many applications both as generally flat sheets and in structures where the corrugated sheets are curved. For example, a product sold by Armco Steel Corporation under the trademark MULTI-PLATE comprises a plurality of corrugated, curved steel pieces, adapted to be bolted together to form a tunnel, pipe arch, culvert, or the like. Individual pieces of MULTI-PLATE are provided with apertures along all four edges, so that a completed structure is produced by overlapping adjacent edges with apertures aligned, and bolting the pieces together.

Ordinarily, two men are utilized to insert the bolt and run the nut up finger tight. When the structure is fully erected, all bolts must then be tightened. Instead of using two men, it is desirable to utilize a bolt which will not turn as the nut is tightened, so that a single workman can tighten all of the nuts from the same side of the structure.

As just indicated, the elements under consideration are corrugated and curved. The aligned apertures for joining adjacent sections together, will be in both the hills and valleys of the corrugations. Under these circumstances, a conventional bolt having a substantially flat surface on the underside of the head has been found unsatisfactory, and the art has developed a bolt having a flat head, but having the underside of the head curved to a spherical radius substantially equal to the radius of the corrugations of the product in question. Such a bolt provides maximum clamping action when utilized in the valleys of the corrugations, and still performs very satisfactorily at the crest of the corrugations.

Figure 1:
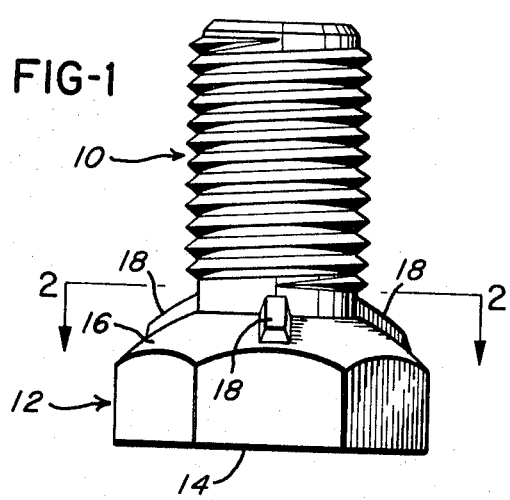
FIG. 1 is a side elevational view of a bolt according to this invention.

The bolt of this invention shown in FIG. 1 comprises essentially a modification of the bolt just described. The bolt includes a threaded shank portion 10 which will be sized as desired, and which is entirely conventional. The head of the bolt indicated generally in the drawings at 12 is hexagonal in cross section and provided with the flat upper surface 14. It will of course be understood that other cross-sectional configurations may be utilized, and that if desired, the upper surface of the head of the bolt may be concave or convex as desired.

In the embodiment illustrated, it will be observed that the underside 16 of the bolt heat 12 is shown as curved to a spherical radius substantially equal to the radius of the curved elements with which the bolt is to be used. However, since the ribs 18 (to be described presently) are the first points of contact with the edges of the aperture in the plates, it is only necessary that the rib outer contour be generally spherical. The undersurface of the bolt head may be conical so long as the ribs are adequately supported to resist undue formation.

Figure 2:
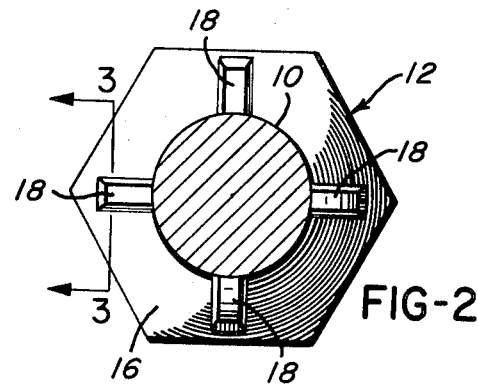
FIG. 2 is a cross-sectional view taken along the line 2—2 of FIG. 1.

As clearly shown in the drawings, the underside of the bolt head is provided with the equally spaced ribs or teeth 18. In the embodiment shown in FIGS. 1-3, it will be observed that four equally spaced ribs 18 are provided.

Figure 3:
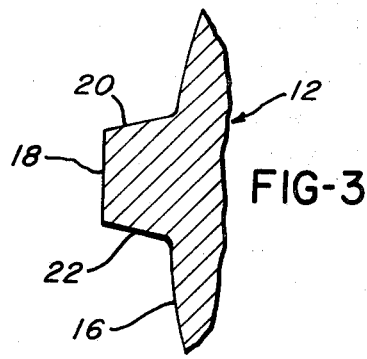
FIG. 3 is a partial cross-sectional view taken along the line 3—3 of FIG. 2.

Referring now to FIG. 3, it will be seen that the ribs 18 are trapezoidal in cross section. The sides 20 and 22 of the rib converge at an angle of approximately 20°.

Referring to FIG. 1, it will be seen that the height of the rib 18 gradually decreases radially outward from the bolt shank. While this is not a requirement, the radius of curvature of the rig outer surface should be equal to or less than the radius of curvature of the corrugations. The ribs in the embodiment of FIG. 1 terminate short of the periphery of the bolt head which tends to minimize visible disturbance of the plates being fastened. In order to insure engagement of the ribs with the edge of the bolt hole, the radial length of the rib should be at least equal the designed clearance between bolt diameter and hole diameter.

It has been indicated throughout this specification that the bolt of this invention is intended primarily for use with a curved steel element. It is recognized that when a perfectly round hole is formed in a curved element, the edges of the hole or aperture will not lie in a single plane. Thus, when the bolt of this invention is inserted through such an aperture, the bolt may be rotated so that four of the ribs are in contact with the edge of the aperture.

A full circumference of the aperture might be considered as having two high points or crests with two intermediate low points or valleys. Thus, the only position wherein four of the rigs 18 are in contact with the edge of the aperture is when each of the four ribs is intermediate one of the high points and one of the low points. With reference to the rotation of the bolt, it should thus be apparent that two diametrically opposed ribs will be in contact with an upwardly sloping portion of the edge of the aperture, while the other two ribs will be in contact with a downwardly sloping portion of the edge of the aperture.

Since the top surface of the trapezoidal rib is tangent to the spherical surface defined by the ribs, it should be apparent that it will be the corner of the trapezoidal rib 18 which will contact the upwardly sloping portion of the edge of the aperture as described above. Thus, a nearly right-angle corner is presented to the edge of the aperture which can securely engage this edge portion of the aperture and prevent rotation of the bolt when a nut is being tightened thereon.

Surprisingly, it has been found that a sharper radius can be formed at the edge of a trapezoid than at the ridge of a triangular shaped rib. Thus, the edge will grip the hole more securely and the mass of the trapezoidal section will resist deformation better than a ridge on a triangular section.

As previously indicated, the height of the rib 18 decreases as the rib progresses radially outward from the bolt stem. This construction provides for greater interference at the edge of the aperture, while at the same time, providing less deformation of the piece away from the edge of the aperture.

Figure 4:
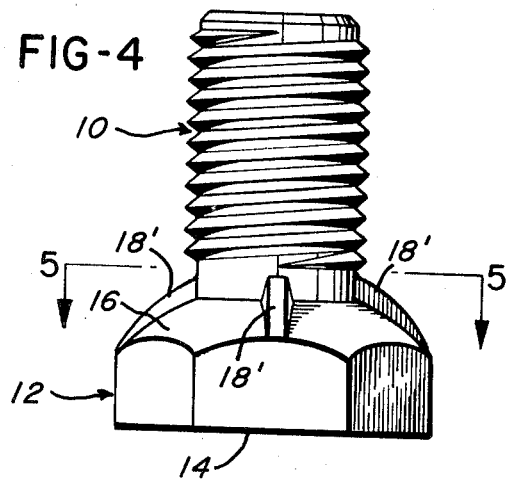
FIG. 4 is a side elevational view similar to FIG. 1 showing a modification of the bolt according to this invention.
Figure 5:
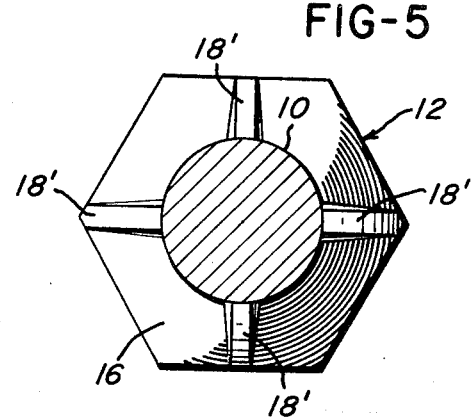
FIG. 5 is a cross-sectional view taken along the line 5—5 of FIG. 4.

A modification of the invention is shown in FIGS. 4 and 5. (Similar reference numerals have been used to identify corresponding parts in the two modifications.)

According to this modification, the ribs 18' extend all the way from the shank 10 of the bolt to the periphery of the head 12. This particular design permits certain economies in the manufacturing operation, and the necessary forming dies are less expensive and have a somewhat longer life.

In all other respects, the design of the bolt of this modification is identical with the modification described earlier.

It is believed that the foregoing constitutes a full and complete disclosure of this invention, and no limitations are intended except as specifically set forth in the claims which follow.

The embodiments of the invention in which an exclusive property or privilege is claimed are defined as follows:

1. A bolt for use in structures comprising overlapping sections having mating apertures in curved portions thereof, comprising
   a. a shank for passage through said apertures having a threaded portion to receive a nut
   b. a head on one end of said shank having on its underside a plurality of ribs of trapezoidal cross section with an arcuate outer axial facing surface, said ribs extending from said shank radially outward and decreasing in height and width from said shank radially outwardly so as to define a continuously decreasing cross-sectional area, the figure of revolution defined by the outer surface of said ribs being a segment of a sphere the radius of which is not greater than that of said curved portions, for engaging the edge of said apertures to prevent rotation of the bolt as a nut is tightened thereon.

2. The bolt claimed in claim 1 wherein said plurality of ribs comprise four equally spaced ribs.

3. The bolt claimed in claim 1 wherein said ribs terminate short of the periphery of said head.

4. The bolt claimed in claim 1 wherein the included angle of the sides of said trapezoidal ribs equal substantially 20°.

* * * * *